United States Patent [19]

Jones

[11] Patent Number: 4,469,310

[45] Date of Patent: Sep. 4, 1984

[54] AUTOMATIC CENTERING PIPE BEVELING MACHINE

[76] Inventor: Hurshel L. Jones, 9504 E. 136th St. North, Collinsville, Okla. 74021

[21] Appl. No.: 534,672

[22] Filed: Sep. 22, 1983

[51] Int. Cl.³ .......................... B23K 7/04; B23K 7/10
[52] U.S. Cl. ............................................. 266/56
[58] Field of Search ............................. 266/56, 69, 71

[56] References Cited

U.S. PATENT DOCUMENTS

| | | | |
|---|---|---|---|
| 2,547,191 | 4/1951 | Young | 148/9.6 |
| 2,851,265 | 9/1958 | Cink | 266/56 |
| 3,572,669 | 3/1971 | Brand | 266/56 |
| 3,975,003 | 8/1976 | Buford | 266/56 |

*Primary Examiner*—W. Stallard
*Attorney, Agent, or Firm*—Head, Johnson & Stevenson

[57] ABSTRACT

An automatic centering pipe beveling machine having a yoke with two leg portions extending from an apex, the angle between the legs of the yoke being X° and the yoke being positionable on a cylinder with the legs in engagement with the cylinder exterior circumferential surface, a frame slideably supported on the yoke and moveable in the plane perpendicular the cylindrical axis and simultaneously in the plane of the cylindrical axis including the yoke apex, the frame having a ring portion supporting a cutting torch, and a feeler extendable perpendicular to the surface of the cylinder received by the yoke and moveable towards the cylinder surface in a fixed relationship with the movement of the frame relative to the yoke, the ratio of movement of the feeler to the movement of the frame being 1 - SinX/2/1 so that the torch supporting circular member is centered with the cylinder when the feeler contacts the surface of the cylinder.

9 Claims, 9 Drawing Figures

AUTOMATIC CENTERING PIPE BEVELING MACHINE

SUMMARY OF THE INVENTION

An operation frequently employed in fabricating products from pipe is that of beveling the end of a length of pipe so that it can be welded to another length of pipe, to a flange, to a vessel or for any other purposes. Therefore, pipe beveling machines are commonly employed in industry. These machines typically include a body portion which is attached to the pipe and a frame which carries with it a ring shaped member having a bevel cutting torch mounted on it. When the frame is centered relative to the pipe the ring shaped member carries the torch around the full circumference of the pipe, cutting a bevel on the end of the pipe. If only a specific diameter pipe is employed in a welding shop it is easy to devise a pipe beveling machine so that when it is positioned on a pipe the ring member carrying the torch is centered with respect to the pipes axis. However, when a machine is to be employed with different diameter pipes, centering the ring member which carries the cutting torch so that it is perfectly centered with respect to a pipe axis is exceedingly time consuming. If the beveling machine is not accurately centered the bevel cut on the pipe will be defective since the spacing between the torch and the pipe will vary as the torch is moved around the ring member.

The present invention provides a pipe beveling machine including means of automatically centering the torch carrying ring member when the device is used on a variety of different pipe diameters.

The automatic centering pipe beveling machine includes a yoke or frame having two leg portions which extend from an apex. While, as is describe in the specifications, the angle of the leg portions may vary, in the preferred embodiment of the invention the angle between the leg portions of the yoke is preferably 60°. The yoke is positioned on the pipe with the legs in contact with the cylindrical surface.

A frame is slideably supported by the yoke and moveable in a plane perpendicular the cylindrical axis of the pipe. The frame is simultaneously moved in the plane of the pipe cylindrical axis which includes the yoke apex. Supported on the frame is a torch carrying ring member. In the preferred arrangement the frame has spaced apart bearings which receive the cylindrical surface of the ring member and the frame includes a drive wheel which engages the peripherial surface of the ring member so that it can be rotated relative to the frame. A torch is supported to the ring member so that when the ring member is rotated it moves around the pipe, the torch serving to cut a bevel on the end of the pipe. The invention is concerned with an automatic means of adjusting the frame relative to the yoke so that the torch supporting ring member will be co-axial with the pipe. This is accomplished by the employment of a feeler member carried by the frame and extendable in the plane of the cylindrical axis which includes the yoke apex. The feeler member is moveable in a fixed relationship with the movement of the frame relative to the yoke. The ratio of movement of the feeler member to the movement of the frame is one to two that is, when the feeler member is moved towards the pipe peripherial surface simultaneously with the movement of the frame in the direction to center the ring member with respect to the pipe axis, the feeler member moves at one-half of the rate of movement of the frame. The feeler member has an inner end which contacts the surface of the cylinder and when this contact is made the frame has moved to the correct position so that the torch carrying member ring is co-axial with the pipe axis.

While the feeler member may be of different configurations a preferred arrangement includes the use of two parallel racks supported by the frame member. A rotatable shaft is supported by the frame member adjacent the racks and in a plane perpendicular the plane of the racks. One end of the first rack is secured to the yoke and one end of the second rack serves as a contact point which is engageable with the cylindrical surface of the pipe when the frame is centered with respect to the pipe. A first gear is carried by the shaft and is in engagement with the first rack and, in like manner a second gear is carried by the shaft and is in engagement with the second rack. The ratio of the diameters of the second gear to the diameters of the first gear is one to two.

The operator can expeditiously use the device by setting the frame on a pipe adjacent the end to be beveled. By rotating the shaft the frame and the end of the second rack are moved until the end of the second rack contacts the surface of the pipe at which time the frame, and more particularly the torch carrying ring member carried by the frame, is centered with respect to the pipe. Thereafter, beveling of the pipe can be accomplished. The adjustment from one pipe diameter to another taking only a few seconds.

DESCRIPTION OF THE PREFERRED EMBODIMENT

Referring first to FIGS. 1, 2, 3 and 6 an exemplary embodiment of the invention is illustrated. The base element of the automatic centering pipe beveling machine is a yoke 10 formed of two leg portions 10A and 10B. The yoke 10 may be formed such as of structural steel panels providing integral side flanges 10C. The yoke portions 10A and 10B form an angle meeting at an apex 12 (See FIG. 3), apex being an imaginary point at the intersection of the interior surfaces of the leg portions 10A and 10B. A top plate 14 is secured to the leg portions 10A and 10B, such as by welding to insure that the leg portion are immoveable relative to each other. For further structural support a plate 16 may be welded to the rearward flanges 10C of each of the leg portions.

The yoke 10 is configured to engage a pipe 18. The invention will be described as it particularly relates to its use in a pipe beveling machine, it being understood that pipe 18 may be any cylindrical member on which the machine may be employed and for which it is important to be able to expeditiously locate a portion relative to the axis of the cylinder. Pipe 18 has an imaginary cylindrical axis 20.

Supported to the yoke 10 is a frame 22. The forward portion of the frame 22 is generally planar and has spaced apart parallel slots 24A and 24B therein. By means of bolts 26 frame 22 may be held in a secure position relative to yoke 10 but with the bolts loosened the frame is free to be slideably positioned in a plane perpendicular the pipe cylindrical axis 20. The slots 24A and 24B are parallel the plane of the pipe cylindrical axis which includes the apex 12 so that the frame 22 is slideable simultaneously in both the planes perpendicular the cylindrical axis 20 and in the plane of the cylindrical axis including apex 12.

Extending from the forward face of frame 22 are three rollers 28. These engage the periphery of a ring member 30 so that the ring member is free to rotate relative to the frame. Secured on the forward portion of the frame is a torch holder 32. The function of the torch holder is to receive and support a cutting torch (not shown) so that the tip thereof from which a metal cutting flame is produced can be carried adjacent the periphery of pipe 18. With a cutting torch secured within the torch holder 32 the ring member may be rotated to carry the torch completely around pipe 18. As previously explained, a frequent operation in connection with the use of pipe is that of providing a bevel on the end of the pipe for facilitating the welding of the pipe to another length of pipe, or some other member. It can be appreciated that in order for the torch secured in holder 32 to properly function relative to pipe 18, the center of ring member 30 must be coincident or co-axial with the cylindrical axis 20 of the pipe.

Figure 1:
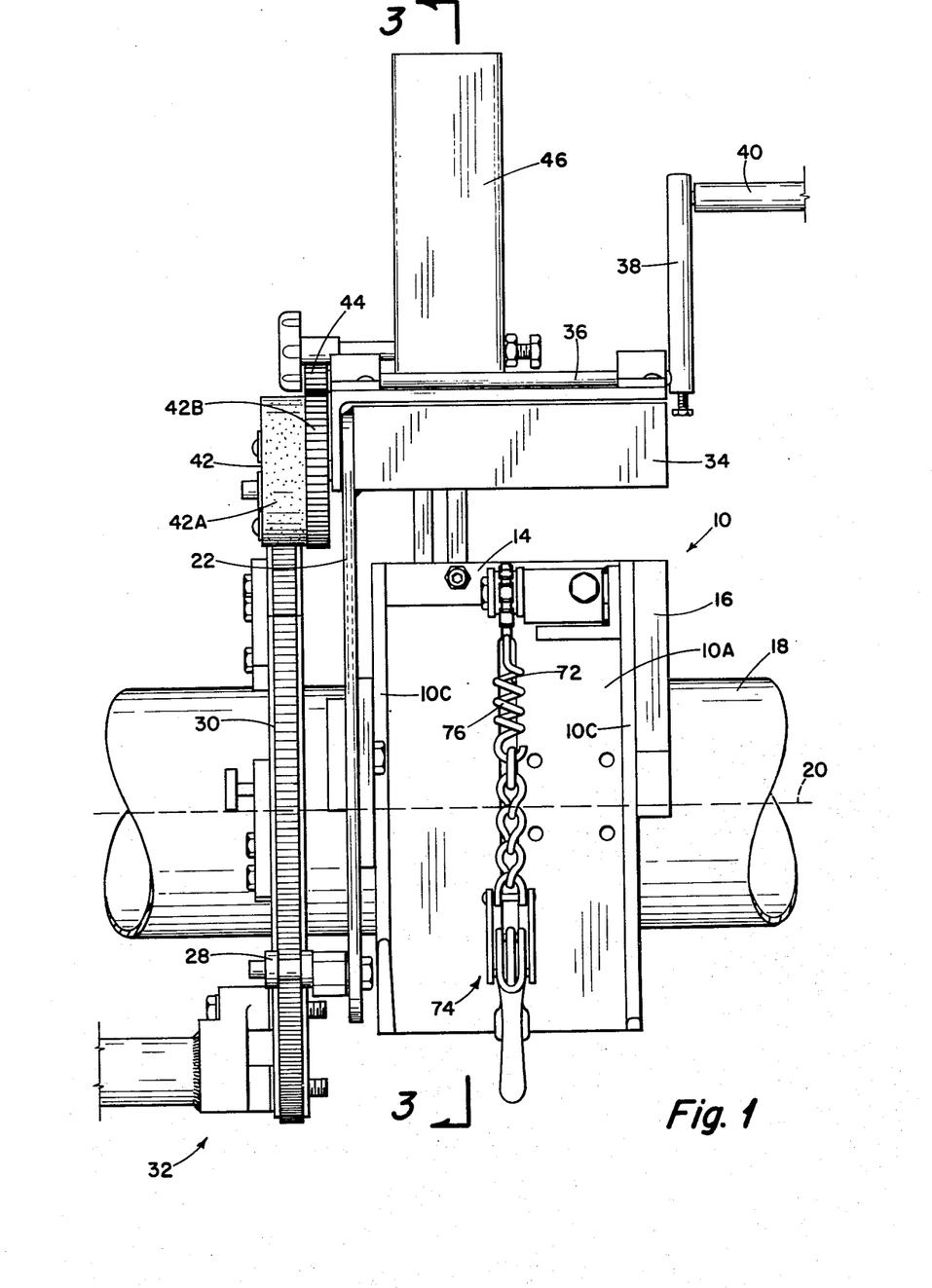
FIG. 1 is a side elevational view of the automatic centering pipe beveling machine shown positioned on a pipe in preparation for beveling the end of the pipe.
Figure 2:
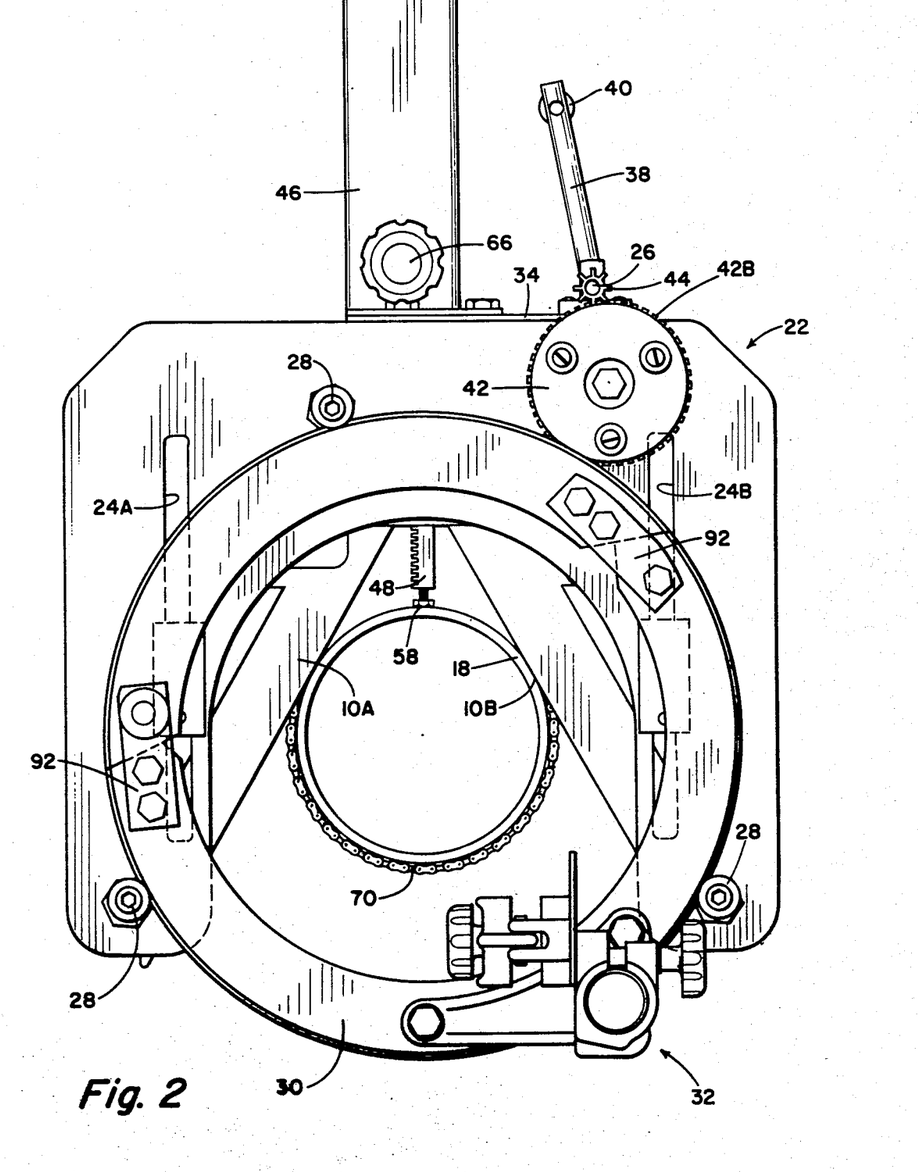
FIG. 2 is an elevational end view of the machine as shown in FIG. 1.
Figure 3:
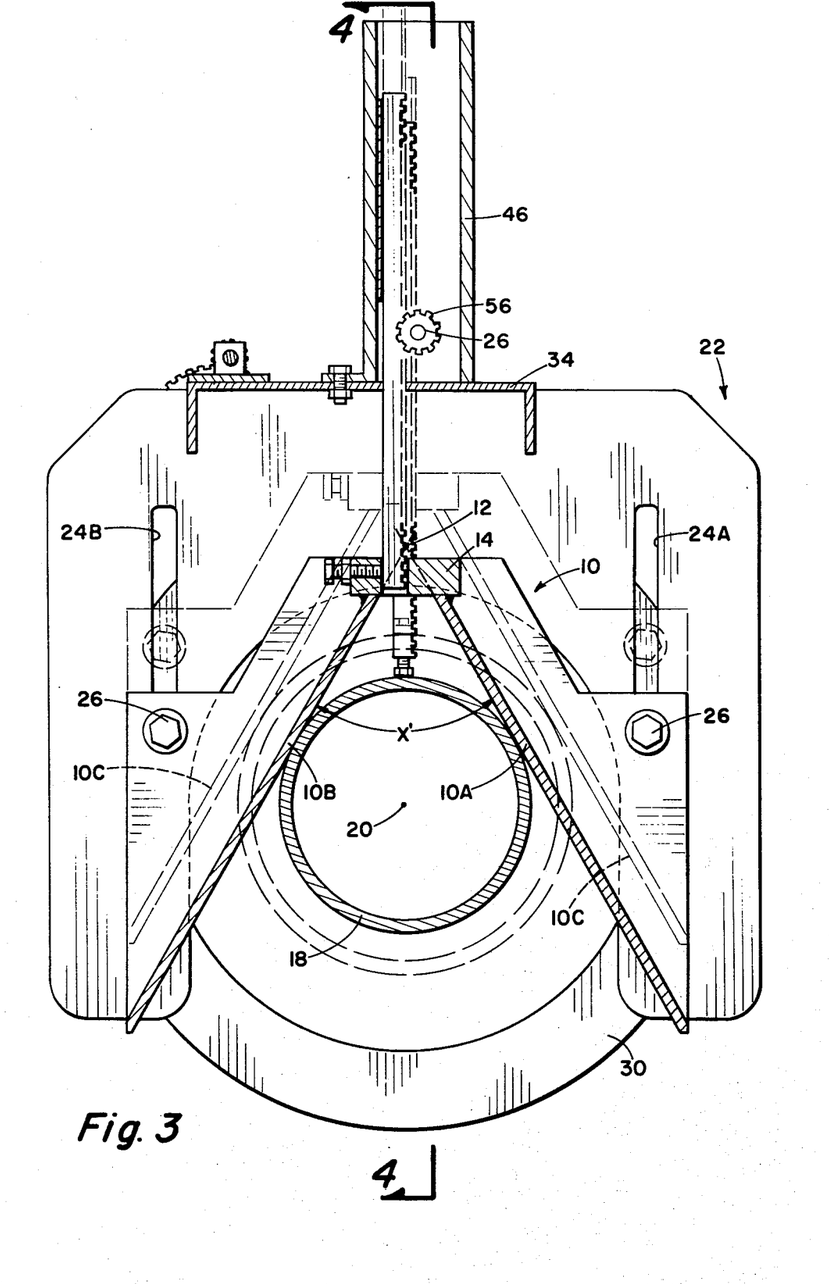
FIG. 3 is an elevational cross-sectional view taken along the line 3—3 of FIG. 1.
Figure 6:
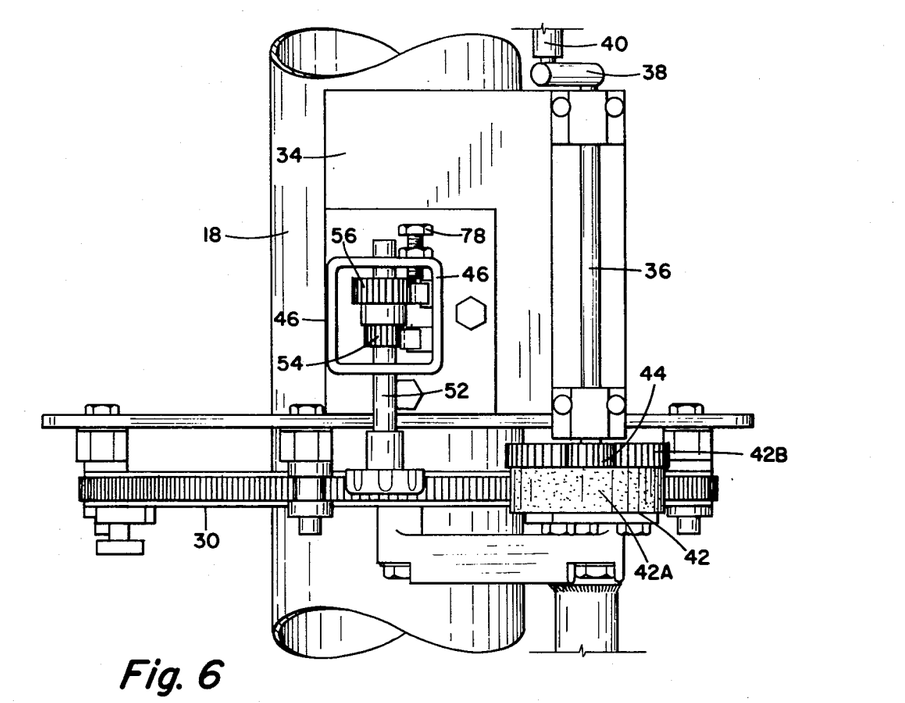
FIG. 6 is a top view of the machine.

Referring to FIGS. 1 and 6, one means of causing the ring member 30 to rotate relative to the pipe is shown. The frame 22 includes a rearwardly extending structural portion 34. Rotatably carried on such portion is a shaft 36 having at its rearward end, a crank arm 38 and handle 40 by which the shaft can be manually rotated. At the other end of the shaft is a drive wheel 42 which preferably has an elastomeric peripherial surface 42A. On the rearward portion of drive wheel 42 and co-axial with the surface 42A, is a gear 42B. This gear is engaged by a drive gear 44 secured to the end of shaft 36. Thus when handle 40 is rotated the drive gear 44 is rotated, turning wheel 42 which in turn, rotates the ring member 30. If the frame is correctly centered with respect to pipe 18 a bevel can be cut by a torch carried by holder 32 and the bevel will be of consistent properties around the full circumference of the pipe.

Devices of the type describe to this point are known and have been used in industry. The present invention is directed towards a means wherein the user can expeditiously center the frame, and thereby the ring member 30, with respect to pipe 18 when the machine is utilized on different diameter pipes. For this purpose, a mechanism is employed which reacts to the movement of the frame 22 relative to yoke 10 to simultaneously move a feeler element to engage the circumference of pipe 18. The operator can thereby expeditiously center the device by controlling the relationship of the frame to the yoke to the point wherein the feeler engages a circumference of the pipe and thereby knows that the ring member 30 is accurately centered and is co-axial with the pipe longitudinal axis 20.

Figure 4:
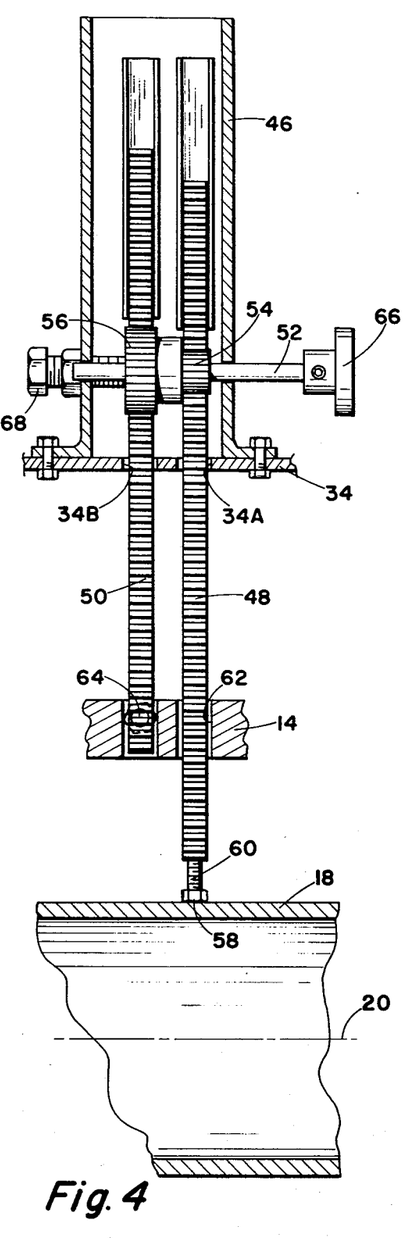
FIG. 4 is a cross-sectional view taken along the line 4—4 of FIG. 3 showing only essential parts of the device to illustrate the principle of operation.
Figure 5:
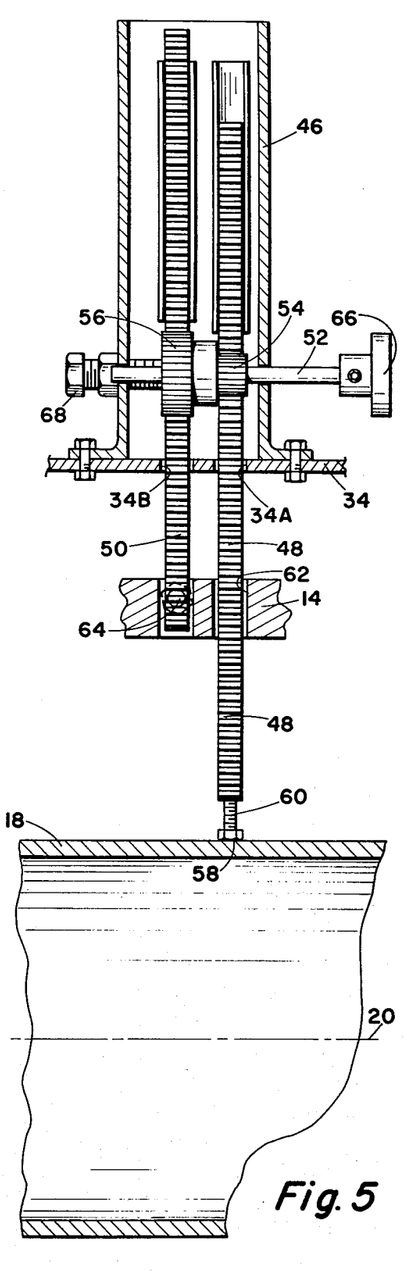
FIG. 5 is a cross-sectional view as in FIG. 4 showing the application of the machine on a different size pipe.

Reference will now be had in addition to the FIGS. 1 through 4, and FIG. 6 previously discussed, but also with reference to FIGS. 4 and 5. Secured to the horizontally extending structural portion 34 forming a part of frame 22 is an upwardly extending gear housing 46 which is illustrated as being of rectangular cross-sectional configuration. The structural portion 34 has two openings 34A and 34B which receive a first rack 48 and a second rack 50. The racks 48 and 50 are parallel to each other and extend perpendicular to the axis 20 of pipe 18. Mounted in gear housing 46 is a shaft 52, the axis of which is parallel the pipe axis 20. Mounted on shaft 52 for simultaneous rotation is a first drive gear 54 and a second drive gear 56. The lower end of first rack 48 provides a feeler contact point 58 which is illustrated as being in the form of a bolt 60 threaded into the lower end of the rack. Provided in the frame top plate is an opening 62 which receives the first rack 48. The lower end of second rack 50 is secured to the frame top plate 14 such as by means of a pin 64. Shaft 52 has a knob 66 affixed to one end by which it can be manually rotated. A bearing bolt 68 is secured to the gear housing 46 to receive the other end of the shaft 52 by which it is rotatably supported.

When the beveling machine is positioned on a pipe it can be secured to the pipe such as by means of a chain 70 extending through slots 72 formed in the yoke legs 10A and 10B. By means of an over center clamp 74 the chain can be tightened around pipe 18 to hold the yoke in secure position. A spring 76 can be employed in series with the chain 70 so that when the over center clamp is tightened tension within spring 76 insures a secure non-moveable engagement of the yoke with the pipe during beveling operations.

With the yoke secured to the pipe the operator must then move the frame 22 so that the ring member 30 is co-axial with the pipe. This can be achieved by rotation of knob 66.

The angle between legs 10A and 10B of the yoke is indicated by X. While this angle may theoretically be any angle greater than 0 and less than 180, from a practical standpoint the angle should be some reasonable amount such as between 45° and 90°. The most practical application of the invention is with the angle X at 60° but, as will be pointed out subsequently, the invention will function when the angle X is other than 60°. The preference for the angle 60° will be described.

It can be seen with reference to FIGS. 4 and 5 that when knob 66 is rotated clockwise yoke 14 is moved downwardly with respect to the frame (portion 34 of the frame being seen in these Figures) and simultaneously, rack 48 is downwardly advanced. When the angle X between the yoke legs is 60°, the ratio of gear 54 to gear 56 is one to two. Thus as the knob 66 is rotated clockwise rack 50 is moved at twice the rate of rack 48. And the same applies when the knob 66 is rotated counter clockwise that is, the ratio of the rate of movements remains the same. With the device properly calibrated, the feeler contact point 58 engages the external circumferential wall of pipe 18 concurrently with the frame being in the position such that ring member 30 is centered co-axially with pipe 18. When the 18. When the machine is employed with a different size pipe, such as is illustrated in FIG. 5 the same adjustments will result in the circular ring being centered with the pipe when the feeler contact 58 engages the surface of the pipe.

Once the adjustment has been made and before cutting operations begin, the operator can secure the frame with respect to the yoke by tightening bolts 26. In addition, as shown in FIGS. 1 and 6, a bolt 78 threadably extending through the wall of the gear housing 46 engages gear 56 so that the shaft 52 will not be inadvertantly rotated. If the device is to be used successfully on the same size pipe the bolt 78 can be used to retain the feeler contact point 58 in its selected relative position. When the device is moved from one pipe to another wherein the pipes are theoretically of the same diameter, the operator can expeditiously determine whether or not the ring member 30 is accurately centered by observing contact point 58. If it extends to far downwardly, the legs 10A and 10B of the yoke will not both contact the pipe. On the other hand, if the legs are in contact with the pipe and the feeler point 58 is not in contact with the pipe then the operator knows that readjustment is necessary.

Figure 9:
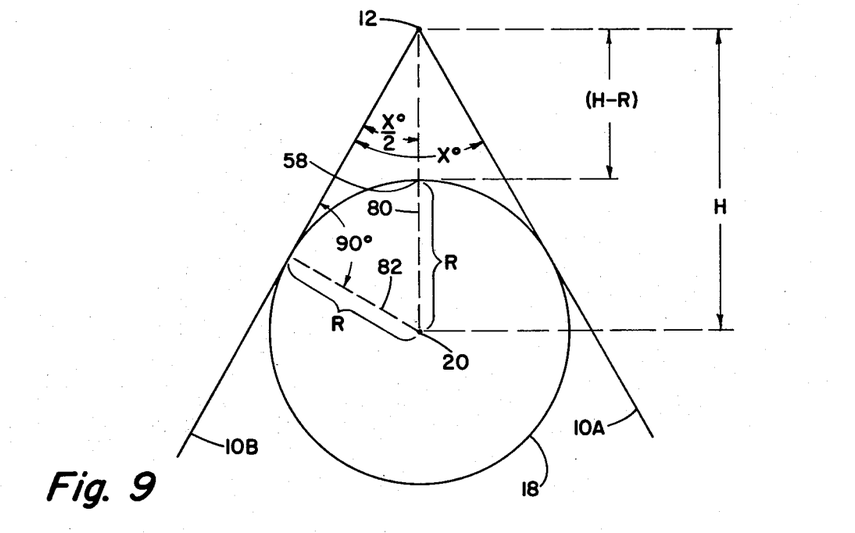
FIG. 9 is a geometrical diagram showing the principal of operation of the invention.

To achieve the results of the invention as heretofore described, for any given angle X the rotation of knob 66 will produce a movement of the feeler point 58 towards the cylindrical surface of pipe 18 in a fixed relationship with the movement of the frame 22 relative to the yoke 10 at a relationship of 1-SinX/2/1. Referring to FIG. 9 this relationship will be described. The frame yoke legs 10A and 10B engage the pipe 18, the angle between the legs being X. An imaginary line 80 is drawn between the apex 12 and the pipe cylindrical axis 20. This line 80 is the hypotenuse of a right triangle with the radius of the pipe 18 indicated by the dotted line drawn from axis 20 to perpendicularly intersect the leg 10B. The acute angle of this formed right triangle is X/2. Assuming that the frame is positioned theoretically, purely for purposes of explaining the principle of the invention, with the center of the ring member 30 coincidenced with apex 12 and with the feeler contact point 58 at the apex 12. When the knob 66 is rotated to move the feeler contact point 58, that is move rack 48 towards the circumference of pipe 18 and to simultaneously move the frame so that the ring 30 becomes co-axial with the cylindrical axis 20, it can be seen that the frame will move a distance H, equally to the hypotenuse of the formed right triangle, while the feeler contact point 58 will move a distance H-R, R being the radius of pipe 18. Since the sign of X/2=R/H the distance the feeler contact point 58 moves is equal to R÷X/2-R while the frame will move a distance of R/Sin X/2. Simplifying this ratio the relative movement of the feeler contact point 58 to the frame is 1-X/2/1.

As previously stated, the preferred practice of the invention is where the angle X is 60°. Thus X/2 is 30°. The sign of 30° is 0.5 therefore, the ratio of movement of the feeler contact point 58 relative to the movement of the frame is 0.5/1 or ½ and consequently, the ratio of the diameter of gears 54 and 56 are ½. If the angle X is other than 60° then gears 54 and 56 must be of different ratios according to the formula.

Figure 7:
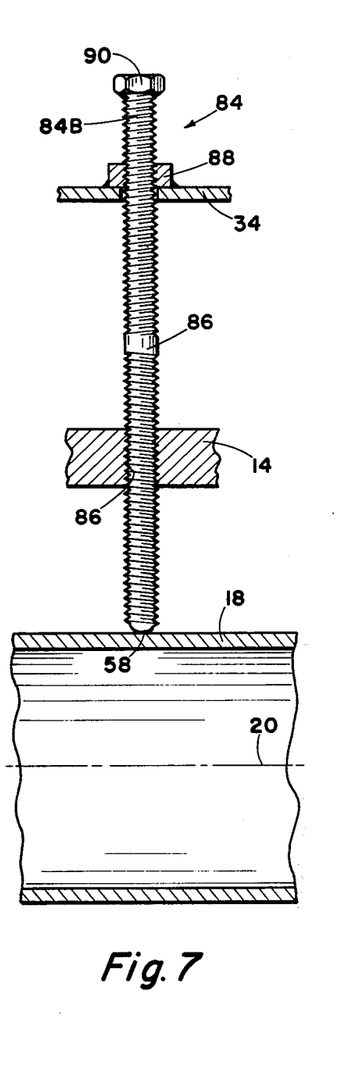
FIGS. 7 and 8 are diagrammatic views showing the use of a different type feeler member for moving the frame relative to the yoke and simultaneously moving a centering contact indicator to engage the circumference of the pipes to indicate that the frame is centered relative to the pipe.
Figure 8:
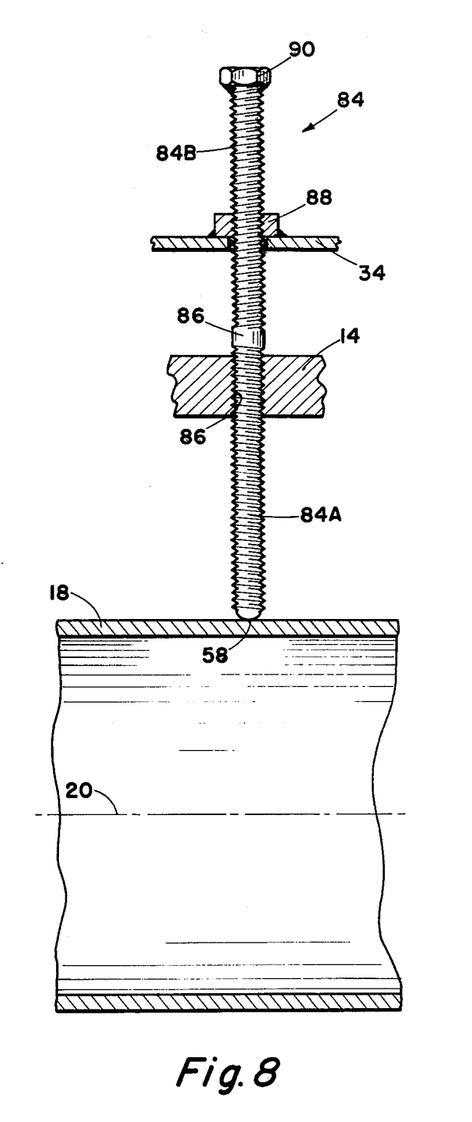

FIGS. 7 and 8 show an alternate embodiment of the invention wherein, in the place of the use of parallel racks and co-axial gears as illustrated in other views of the invention, a bolt 84 is employed. The bolt 84 has a lower portion having the threads of one orientation, such as left hand threads and the upper portion of the bolt 84B has the opposite oriented thread lead, such as right hand threads, the division between the right and left hand threads being indicated by the bolt portion 86. The yoke top plate 14 has a threaded opening 86 which receives the left hand threaded portion 84A. The frame structural portion 34 has secured to it a nut 88 which receives the bolt upper right hand threaded portion 84B. The lower end of the bolt forms the feeler contact point 58. The upper end of the bolt includes a hex head 90 by which the bolt may be rotated.

The arrangement of FIGS. 7 and 8 wherein the lead of the right hand threaded portion 84B and the left hand threaded portion 84A is the same will function only when the angle X between the legs of the yoke is 60°. It can be seen, by comparing FIGS. 7 and 8 showing the use of the device on pipes 18 of different diameters that the same ratio of movements are achieved between the frame relative to the yoke and the feeler contact point 58 relative to the yoke as with the gear arrangements of FIGS. 4 and 5. By employing thread relationship having different leads the arrangements of FIGS. 7 and 8 may be utilized wherein an angle X is other than 60 degrees.

An apparatus has been described herein to illustrate one practical embodiment of the principles of the invention. Many details concerned with the application of the invention to a pipe beveling machine have not been described in detail since they are well known to practitioners in the industry. For instance, the ring member 30 can include provisions so that it can be separated into two parts if it is necessary to position it over a pipe rather than to position it longitudinally onto the end of a pipe. This can be accomplished by the use of linkages 92 held by bolts so that the ring is formed in two portions. These elements are commonly employed in pipe beveling machines and therefore it is not necessary that they be described herein in detail.

While the invention is will normally be practiced in the arrangement illustrated herein in which the beveling machine sits astride a pipe 18 with the portions balanced on the pipe such that the gear housing 46 extends upwardly, it can be seen that this has no relationship to the operation of the device. The invention will function equally as well when oriented in any other direction and it can particularly be employed when inverted relative to the views shown in the drawing and arranged so that the pipe 18 rests within the yoke legs 10A and 10B for structural support. The frame would still be positioned to obtain centering of the ring member 30 when the feeler contact 58 engages the circumference of the pipe in the same way regardless of the orientation.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An apparatus for centering a member relative to a cylinder comprising:
   a yoke having two leg portions extending from an apex the legs being spaced X° apart, wherein X is more than 0° and less than 180°, the yoke being positionable on a cylinder with the legs in engagement therewith;

a frame slideably supported to said yoke and moveable in the plane perpendicular the cylindrical axis and simultaneously in the plane of the cylindrical axis including said yoke apex, the frame having a portion thereof to be centered with respect to the cylindrical axis of the cylinder;

a feeler extendable perpendicular to the surface of cylinder received by said yoke and moveable towards the cylinder surface in a fixed relationship with the movement of said frame relative to said yoke, the ratio of movement of the feeler to the movement of said frame being 1-Sin X/2/1 whereby the frame portion is centered when said feeler contacts the surface of the cylinder.

2. An apparatus for centering a member relative to a cylinder according to claim 1 wherein said portion of said frame to be centered with respect to a cylinder is a circular member having an opening therein receiving the cylinder.

3. An apparatus for centering a member according to claim 2 wherein the cylinder is a length of pipe and including:
a cutting torch carried by said circular member; and
means of moving said torch around the full circumference of said circular member to perform work on the pipe.

4. An apparatus for centering a member relative to a cylinder according to claim 1 including:
a first and second parallel rack carried by said frame, one end of the first rack being secured to said yoke, and one end of said second rack being said feeler and being engageable with the cylinder;
a rotatable shaft supported adjacent said racks and in a plane perpendicular the plane of the racks;
a first gear secured on said shaft and in engagement with said first rack; and
a second gear secured on said shaft and in engagement with said second rack, the ratio of the diameter of said second gear to said first gear being 1-Sin X/2/1.

5. An apparatus for centering a member relative to the cylindrical axis of a cylinder, comprising:
a yoke having two leg portions extending from an apex, the angle between the legs being 60°, the yoke being positionable on a cylinder with the legs in engagement with the cylindrical surface;
a frame slideably supported by said yoke and moveable in a plane perpendicular the cylindrical axis of the cylinder and simultaneously in the plane of the cylindrical axis including said yoke apex, the frame having a member to be centered with respect to the cylinder axis; and
a feeler member carried by said frame and extendable in the plane of the cylindrical axis including said yoke apex and moveable in a fixed relationship with the movement of said frame relative to said yoke, the ratio of movement of the feeler member to the movement of said frame being one to two, whereby the frame member is centered with the cylindrical axis when the feeler contacts the surface of the cylinder.

6. An apparatus for centering a member relative to a cylinder according to claim 5 wherein said portion of said frame to be centered with respect to a cylinder is a circular member having an opening therein receiving the cylinder.

7. An apparatus for centering a member according to claim 6 wherein the cylinder is a length of pipe and including:
a cutting torch carried by said circular member; and
means of moving said torch around the full circumference of said circular member to perform work on the pipe.

8. An apparatus for centering a member relative to a cylinder according to claim 5 including:
a first and second parallel rack carried by said frame, one end of the first rack being secured to said yoke, and one end of said second rack being said feeler and being engageable with the cylinder;
a rotatable shaft supported adjacent said racks and in a plane perpendicular of the plane of the racks;
a first gear secured on said shaft and in engagement with said first rack; and
a second gear secured on said shaft and in engagement with said second rack, the ratio of the diameter of said second gear to said first gear being $\frac{1}{2}$.

9. An apparatus according to claim 5 wherein said feeler member carried by said frame is a bolt extending in the plane of the cylindrical axis including said yoke apex, said yoke having a threaded opening in the apex thereof receiving said bolt and said frame having a threaded opening therein also receiving said bolt, the said threaded openings being of opposite lead directions the portion of the frame receiving said bolt being spaced at the greater radius from the cylinder axis, the portion of the bolt received in said yoke threaded opening having a lead direction matching the opening, and the portion of the bolt received in said frame threaded opening having an opposite lead direction matching the frame opening, the inner end of the bolt contacting the circumference of the pipe when said frame member is centered with said cylinder axis and the outer end of said bolt having means for the rotation thereof.

* * * * *